United States Patent
Murugan

(10) Patent No.: US 8,352,336 B2
(45) Date of Patent: Jan. 8, 2013

(54) SYSTEM AND METHOD FOR ALLOCATING MANUFACTURED PRODUCTS TO SELLERS USING PROFITABLE ORDER PROMISING

(75) Inventor: Arvindh Murugan, Flower Mound, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 307 days.

(21) Appl. No.: 12/108,947

(22) Filed: Apr. 24, 2008

(65) Prior Publication Data

US 2008/0275795 A1  Nov. 6, 2008

Related U.S. Application Data

(60) Provisional application No. 60/915,227, filed on May 1, 2007.

(51) Int. Cl.
  *G06Q 10/00* (2012.01)
(52) U.S. Cl. ........................................... 705/28
(58) Field of Classification Search ............... 705/10, 705/28, 1.1
  See application file for complete search history.

(56) References Cited

U.S. PATENT DOCUMENTS

| | | | |
|---|---|---|---|
| 6,167,380 A * | 12/2000 | Kennedy et al. | 705/10 |
| 6,338,053 B2 * | 1/2002 | Uehara et al. | 1/1 |
| 6,934,594 B2 * | 8/2005 | Loring et al. | 700/100 |
| 7,050,990 B1 * | 5/2006 | Chu et al. | 705/14.71 |
| 7,085,729 B1 * | 8/2006 | Kennedy et al. | 705/10 |
| 7,130,707 B2 * | 10/2006 | Chao et al. | 700/100 |
| 7,299,201 B2 * | 11/2007 | Jammes et al. | 705/26 |
| 7,305,419 B1 * | 12/2007 | Cosby et al. | 1/1 |
| 7,584,113 B2 * | 9/2009 | Denton et al. | 705/7.22 |
| 2002/0103690 A1 * | 8/2002 | Lyon et al. | 705/9 |
| 2003/0172007 A1 * | 9/2003 | Helmolt et al. | 705/28 |
| 2004/0068430 A1 * | 4/2004 | Peachey-Kountz et al. | 705/10 |
| 2007/0050069 A1 * | 3/2007 | Treichler et al. | 700/99 |
| 2007/0271132 A1 * | 11/2007 | Peachey-Kountz et al. | 705/10 |
| 2008/0004741 A1 * | 1/2008 | Geroulo | 700/107 |
| 2008/0215175 A1 * | 9/2008 | Geroulo | 700/99 |
| 2008/0235703 A1 * | 9/2008 | Crawford et al. | 718/104 |

OTHER PUBLICATIONS

Ray, Saibal. Lead time management in supply chains. Diss. University of Waterloo (Canada), 2001. ABI/INFORM Global, ProQuest. Web. Jul. 25, 2012.*

* cited by examiner

*Primary Examiner* — Seye Iwarere
(74) *Attorney, Agent, or Firm* — Booth Udall, PLC; Steven J. Laureanti

(57) ABSTRACT

A system and method is disclosed for allocating products to one or more sellers. The system includes a database operable to store data associated with one or more enterprises. The system further includes an order promising system coupled with the database and operable to model the flow of the products through the one or more enterprises and allocate resources to the one or more sellers based on the modeled flow of the products.

47 Claims, 3 Drawing Sheets

| ATP BUCKETS | SUPPLY | WEEK 1 | WEEK 2 | WEEK 3 | WEEK 4 | WEEK 5 | WEEK 6 | WEEK 7 | WEEK 8 | WEEK 9 | WEEK 10 | WEEK 11 | WEEK 12 | |
|---|---|---|---|---|---|---|---|---|---|---|---|---|---|---|
| | FP MANUFACT. | 0 ~~10~~ | 0 ~~9~~ | 0 ~~9~~ | 0 ~~11~~ | 0 ~~8~~ | 0 ~~9~~ | 0 ~~9~~ | 0 | 0 | 0 | 0 | 0 | ← 511 |
| | FP IN-PROCESS | 10 | 10 | 9 | 12 | 13 | 13 | 12 | 14 | 11 | 10 | 9 | 8 | ← 512 |
| | FP TOTAL | 10 | 19 | 18 | 22 | 21 | 22 | 21 | 14 | 11 | 10 | 9 | 8 | ← 513 |
| | IM MANUFACT. | 20 | 19 | 18 | 11 ~~7~~ | 20 | 18 ~~19~~ | 6 ~~20~~ | 21 | 18 ~~22~~ | 23 | 25 | 11 | ← 514 |
| | IM IN-PROCESS | | | 10 | 10 | 10 | 10 | 10 | 10 | 10 | 10 | 10 | 10 | ← 515 |
| | IM TOTAL | 20 | 19 | 28 | 27 | 30 | 29 | 30 | 31 | 32 | 33 | 35 | 21 | ← 516 |
| | RES | 10 | 11 | 12 | 7 ~~13~~ | 13 | 11 ~~12~~ | 0 ~~4~~ | 11 | 6 ~~10~~ | 9 | 8 | 7 | ← 517 |
| | RM1 | 10 | 10 | 10 | 10 | 10 | 10 | 10 | 10 | 10 | 10 | 10 | 10 | ← 518 |
| | RM2 | 11 | 11 | 11 | 11 | 11 | 11 | 11 | 11 | 11 | 11 | 11 | 11 | ← 519 |

| | ALLOCATION | MONTH 1 | MONTH 2 | MONTH 3 | |
|---|---|---|---|---|---|
| RES | TOTAL SUPPLY | 46 | 50 | 34 | ← 521 |
| TOP SELLER | TOTAL | 10 | 15 | 4 | ← 522 |
| | RETAINED | 2 | 5 | 0 | ← 523 |
| | LOCAL POOL | ($15) | 10 | 0 ~~4~~ | ← 524 |
| ├ SELLER1 | TOTAL | 30 | 20 | 30 | ← 525 |
| | RETAINED | 10 | 0 | 5 | ← 526 |
| | LOCAL POOL | (UNRESTRICTED) 20 | (UNRESTRICTED) 20 | (UNRESTRICTED) 25 | ← 527 |
| └ SELLER2 | TOTAL | 6 | 15 | 0 | ← 528 |
| | RETAINED | 0 | 0 | 0 | ← 529 |
| | LOCAL POOL | (UNRESTRICTED) 0 ~~6~~ | (UNRESTRICTED) 0 ~~15~~ | (UNRESTRICTED) 0 | ← 530 |

*FIG. 5*

SYSTEM AND METHOD FOR ALLOCATING MANUFACTURED PRODUCTS TO SELLERS USING PROFITABLE ORDER PROMISING

CROSS-REFERENCE TO RELATED APPLICATIONS

The present invention is related to that disclosed in U.S. Provisional patent application Ser. No. 60/915,227, filed 1 May 2007, entitled "EXTENDING A SYSTEM AND METHOD FOR ALLOCATING MANUFACTURED PRODUCTS TO SELLERS FOR PROFITABLE TO PROMISE". U.S. Provisional Patent Application Ser. No. 60/915,227 is assigned to the assignee of the present application. The subject matter disclosed in U.S. Provisional Patent Application Ser. No. 60/915,227 is hereby incorporated by reference into the present disclosure as if fully set forth herein. The present invention hereby claims priority under 35 U.S.C. §119(e) to U.S. Provisional patent application Ser. No. 60/915,227.

TECHNICAL FIELD OF THE INVENTION

This invention relates generally to supply chain management, and more particularly to a system and method for allocating manufactured products to sellers using profitable order promising.

BACKGROUND OF THE INVENTION

Manufacturing enterprises produce products to be delivered to customers, based on various needs, such as, customer orders, customer demands, or customer requests. For example, a customer order may require delivery of a particular quantity of a product by a particular date. However, manufacturing enterprises have various manufacturing constraints, such as, for example, capacity constraints and material constraints that may not allow a manufacturing enterprise to fulfill every customer order. That is, some customer orders may not receive any promises, while other customer orders may only receive inadequate promises. This inability to make promises to fulfill customer orders is undesirable.

In an effort to overcome the above-discussed deficiencies, manufacturing enterprises have tried to reserve products in an attempt to provide differentiated service levels to customers during the order promise and fulfillment process. However, these reservations are typically based on forecasts that become inaccurate due to various inadequacies with the forecasts. In addition, because these forecasts are often inaccurate, customer orders are either not promised, when they could have been or are promised but are not fulfilled. This inability to accurately make promises and fulfill customer orders is also undesirable.

SUMMARY OF THE INVENTION

A system for allocating products to one or more sellers is disclosed. The system includes a database operable to store data associated with one or more enterprises. The system further includes an order promising system coupled with the database and operable to model the flow of the products through the one or more enterprises and allocate resources to the one or more sellers based on the modeled flow of the products.

A method for allocating products to one or more sellers is also disclosed. The method provides for modeling the flow of the products through one or more enterprises. The method further provides for allocating resources to the one or more sellers based on the modeled flow of the products.

Software for ration allocating products to one or more sellers is also disclosed. The software is operable to model the flow of the products through one or more enterprises. The software is further operable to allocate resources to the one or more sellers based on the modeled flow of the products.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

FIG. 5 illustrates a profitable order promising interface according to the supply chain model of FIG. 4.

DETAILED DESCRIPTION OF THE INVENTION

Reference will now be made to the following detailed description of the preferred and alternate embodiments. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
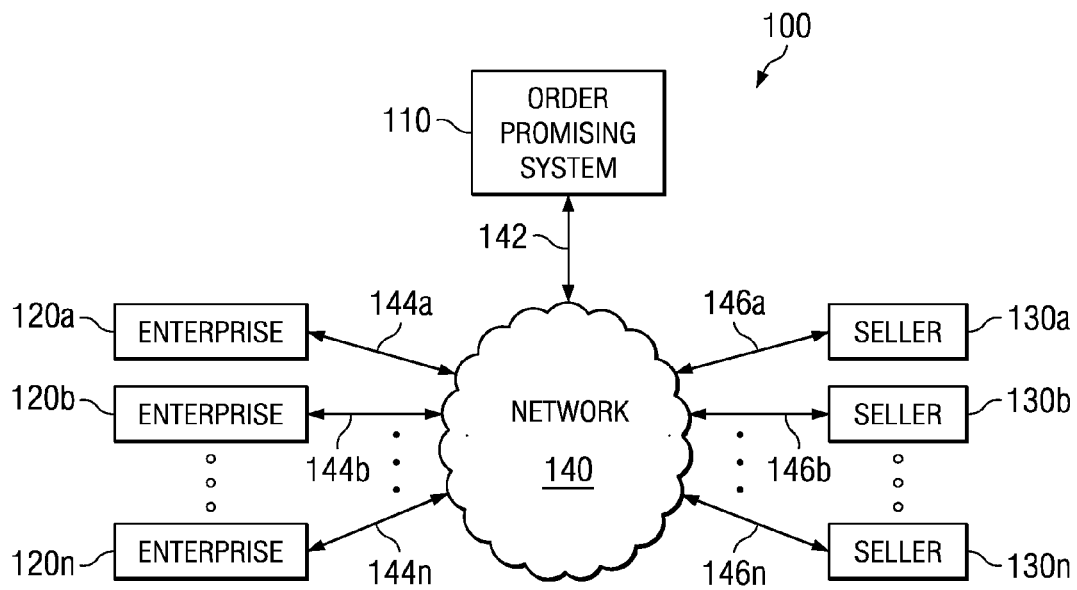
FIG. 1 illustrates an exemplary supply chain network according to a preferred embodiment.

FIG. 1 illustrates an exemplary supply chain network 100 according to a preferred embodiment. Supply chain network 100 comprises an order promising system 110, one or more enterprises 120a-120n, one or more sellers 130a-130n, a network 140, and communication links 142, 144a-144n and 146a-146n. Although a single order promising system 110, one or more enterprises 120a-120n, and one or more sellers 130a-130n, are shown and described, embodiments contemplate any number of order promising systems 110, any number of enterprises 120a-120n and/or any number of sellers 130a-130n, according to particular needs. In addition, or as an alternative, order promising system 110 may be integral to or separate from the hardware and/or software of any one of the one or more enterprises 120a-120n and/or one or more sellers 130a-130n.

In one embodiment, supply chain network 100 may model the flow of manufactured products, such as, for example, materials, items, goods, and/or services through one or more enterprises 120a-120n, one or more sellers 130a-130n, and/or any other supply chain planning environments associated with supply chain network 100. As described below, order promising system 110 may be used to allocate resources based on profitable order promising. For example, one or more enterprises 120a-120n may receive a customer demand (i.e., customer request or customer order) from one or more sellers 130a-130n. Order promising system 110 may than prioritize the allocations, associated with the received customer order based on the level of priority of the seller, associated with the received customer order.

In one embodiment, order promising system 110 may comprise multiple components, such as for example, order promising engines, optimizers, workflows, or any other like components for using profitability as a constraint for allocating manufactured products to sellers. In addition, or as an alternative, order promising system 110 may comprise one or more servers and one or more databases or other data storage arrangements at one or more locations, local to, or remote from order promising system 110, one or more enterprises 120a-120n, and one or more sellers 130a-130n and may be made available to one or more associated users of one or more enterprises 120a-120n and one or more sellers 130a-130n using network 140 or in any other appropriate manner.

In one embodiment, supply chain network 100 may operate on one or more computers that may be integral to, or separate from, the hardware and/or software that support order promising system 110, one or more enterprises 120a-120n, and one or more sellers 130a-130n. These one or more computers may include any suitable input device, such as a keypad, mouse, touch screen, microphone, or other device to input information. In addition, these one or more computers may include any suitable output device that may convey information associated with the operation of supply chain network 100, including digital or analog data, visual information, or audio information. Furthermore, these one or more computers may include fixed or removable storage media, such as magnetic computer disks, CD-ROM, or other suitable media to receive output from and provide input to Supply chain network 100. In addition, these one or more computers may include one or more processors and associated memory to execute instructions and manipulate information according to the operation of supply chain network 100.

In addition, or as an alternative, order promising system 110, one or more enterprises 120a-120n, and/or one or more sellers 130a-130n may each operate on one or more separate computers or may operate on one or more shared computers. Each of these one or more computers may be a work station, personal computer (PC), network computer, personal digital assistant (PDA), wireless data port, or any other suitable computing device. In another embodiment, one or more users may be associated with one or more enterprises 120a-120n and/or one or more sellers 130a-130n. These one or more users may include, for example, a "planner" handling order promising, order fulfillment, and/or one or more related tasks within supply chain network 100. In addition, or as an alternative, these one or more users within supply chain network 100 may include, for example, one or more computers programmed to autonomously handle order promising, order fulfillment, and/or one or more related tasks within supply chain network 100.

In one embodiment, order promising system 110 may be coupled with network 140 using communications link 142, which may be any wireline, wireless, or other link suitable to support data communications between order promising system 110 and network 140 during operation of supply chain network 100. One or more enterprises 120a-120n may be coupled with network 140 using communications link 144a-144n, which may be any wireline, wireless, or other link suitable to support data communications between one or more enterprises 120a-120n and network 140 during operation of supply chain network 100. One or more sellers 130a-130n may be coupled with network 140 using communications links 146a-146n, which may be any wireline, wireless, or other link suitable to support data communications between one or more sellers 130a-130n and network 140 during operation of supply chain network 100.

Although communication links 142, 144a-144n and 146a-146n are shown as generally coupling order promising system 110, one or more enterprises 120a-120n, and one or more sellers 130a-130n to network 140, order promising system 110, one or more enterprises 120a-120n, and one or more sellers 130a-130n may communicate directly with each other, according to particular needs. In addition, or as an alternative, order promising system 110 may reside within one or more enterprises 120a-120n and/or one or more sellers 130a-130n, according to particular needs.

In another embodiment, network 140 may include the Internet and any appropriate local area networks (LANs), metropolitan area networks (MANS), or wide area networks (WANs) coupling order promising system 110, one or more enterprises 120a-120n, and one or more sellers 130a-130n. Those skilled in the art will recognize that the complete structure and operation of communication network 140 and other components within supply chain network 100 are not depicted or described. Embodiments may be employed in conjunction with known communications networks and other components.

Figure 2:
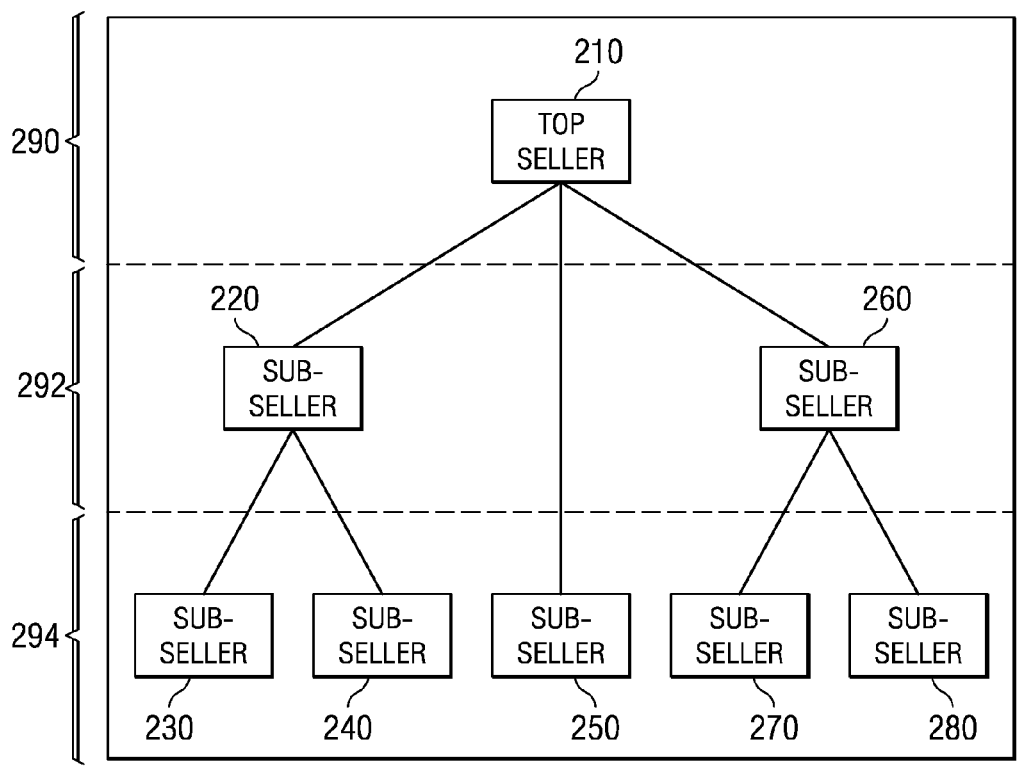
FIG. 2 illustrates a seller hierarchy according to one embodiment.

FIG. 2 illustrates a seller hierarchy 200, according to one embodiment. Seller hierarchy 200 comprises a top seller 210, sub-sellers 220-280, and seller tiers 290-294. In one embodiment, order promising system 110 may provide a seller hierarchy model that represents a hierarchy of sellers, such as, for example, seller hierarchy 200. In addition, or as an alternative, the seller hierarchy model may be stored in one or more databases or other data storage arrangements associated with order promising system 110. The seller hierarchy model may represent a different hierarchy of sellers for each product associated with one or more enterprises 120a-120n. Although, seller hierarchy 200 is shown and described as comprising a particular hierarchy of sellers, embodiments contemplate any suitable hierarchy of sellers, according to particular needs.

As an example only and not by way of limitation, top seller 210 may represent a seller (i.e., one or more sellers 130a-130n) associated with the worldwide sales of a manufacturing enterprise, such as, for example, any one of the one or more enterprises 120a-120n. Sub-seller 220 may represent a seller associated with the sales of the manufacturing enterprise to a particular customer, such as, for example, customer A. Sub-sellers 230-240 may represent sellers associated with the sales of the manufacturing enterprise to one or more business units of customer A. Sub-seller 250 may represent a seller associated with the sales of the manufacturing enterprise to another customer, such as, for example, customer B. Sub-seller 260 may represent a seller associated with the sales of the manufacturing enterprise to another customer, such as, for example, customer C. Sub-sellers 270 and 280 may represent sellers associated with the sales of the manufacturing enterprise to one or more business units of customer C.

In one embodiment, one or more enterprises 120a-120n may make allocations to any level in the hierarchy of sellers. Sellers may use these allocations for themselves or any of the members associated with the hierarchy of sellers, depending upon allocation policies of the seller hierarchy model. In addition, or as an alternative, a seller, in the hierarchy of sellers, may act as an agent of one or more enterprises 120a-120n and make promises for those enterprises. In addition, sellers may manage orders and promises for a single manufactured product or multiple manufactured products, that is, each product may be managed independently, or grouped together with other manufactured products into product groups. These orders and promises are aggregated up to the top seller, of the hierarchy of sellers, such that the demand at the top seller may then be placed as a customer demand for the hierarchy of sellers. In another embodiment, a seller, in the hierarchy of sellers, is committed to anything its sub-sellers is committed to, that is, with reference to FIG. 2, top seller 210 is committed to anything sub-sellers 220-280 is committed to, sub-seller 220 is committed to anything sub-sellers 230-240 is committed to, and sub-seller 260 is committed to anything sub-sellers 270-280 is committed to.

In one embodiment, one or more enterprises 120a-120n may categorize the seller hierarchy model into various seller tiers. That is, the sellers, in the hierarchy of sellers, may have an associated rank used to prioritize the allocations. Seller tier 290 may comprise top seller 210, seller tier 292 may comprise sub-sellers 220 and 260, and seller tier 294 may comprise sub-sellers 230-250 and 270-280. In addition, or as an alternative, sellers with a higher prioritization may receive their allocations before the allocation goes to sellers with lower prioritization. As an example only and not by way of limitation, if the allocated amount associated with seller tier 292 (i.e., top seller 210) is less than what is needed by seller tiers 292-294 (i.e., sub-sellers 230-280), the allocation may be distributed among the sellers as specified by profitable order promising, as discussed below in more detail. Although, seller hierarchy 200 is shown and described as comprising various seller tiers, embodiments contemplate any suitable categorization of sellers that provide for prioritization into ranks, tiers, groups, or the like.

Figure 3:
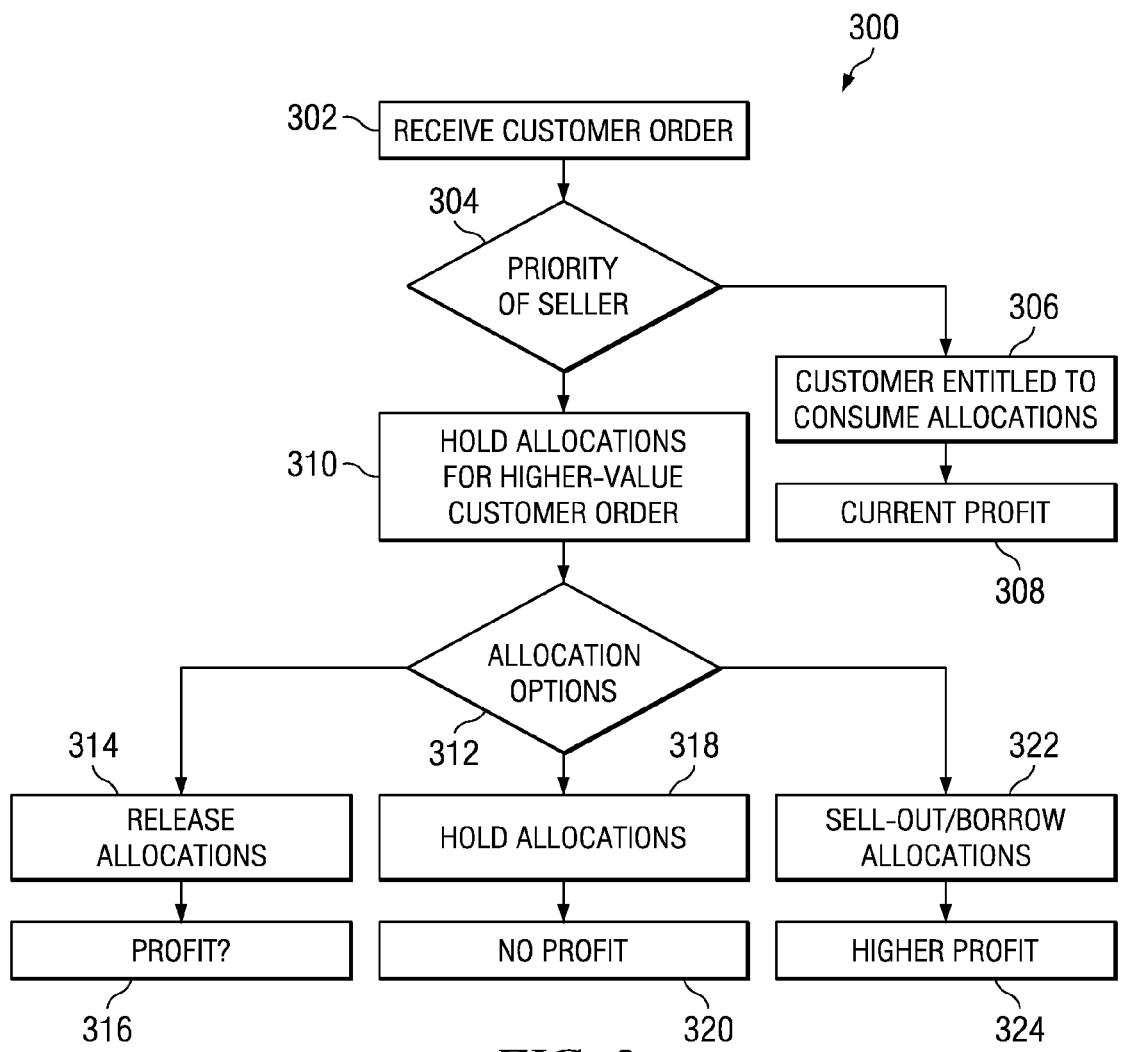
FIG. 3 illustrates an exemplary method for allocating manufactured products to sellers using profitable order promising.

FIG. 3 illustrates an exemplary method 300 for allocating manufactured products to sellers using profitable order promising. The method begins at step 302, where a customer order associated with one or more sellers 130a-130n is received at one or more enterprises 120a-120n. As discussed above, order promising system 110 may provide a seller hierarchy model that represents a hierarchy of sellers, wherein one or more sellers 130a-130n may provide customer orders to one or more enterprises 120a-120n, who may in turn, provide allocations at any level in the hierarchy of sellers.

At step 304, order promising system 110 determines the priority of the seller associated with the received customer order. As discussed above, the sellers, in the hierarchy of sellers, may have an associated rank, which may be used to prioritize allocations. That is, sellers with a higher prioritization may receive allocations prior to allocation provided to sellers with lower prioritization. Order promising system 110 may determine the level of priority of the seller associated with the received customer order, at step 304. If order promising system 110 determines that the seller associated with the received customer order, is at a prioritization to consume the allocations, the method proceeds to step 306. At step 306, order promising system 110 promises the allocations to the seller associated with the received customer order. Among other things, this preserves customer commitments previously made with higher prioritized sellers and fulfills any backlog associated with previous commitments.

At step 308, the profit associated with the received customer order and promised at step 306, is based on various contractual commitments previously made between the one or more enterprises 120a-120n and the seller associated with the received customer order. If order promising system 110 determines that the seller associated with the received customer order, is not at a prioritization to consume the allocations, the method proceeds to step 310.

At step 310, because the allocation associated with the received customer order was not promised, order promising system 110 holds the allocation for a higher-value customer order based on profitable order promising (i.e., profitable-to-promise). At step 312, a determination is made as to the allocation of the manufactured products associated with the received customer request. Order promising system 110 may determine to release the allocations to the seller associated with the received customer order, even though the priority of the seller may not meet a particular threshold, the method may than proceed to step 314. At step 314, order promising system 110 releases the allocations and promises the allocations to the seller associated with the received customer order. At step 316, the profit associated with the received customer order and promised at step 306, is based on an amount offered by the seller, which may be less than or more than a higher-value customer order.

Order promising system 110 may determine to hold the allocations and not to allow the seller associated with the received customer order, to consume the allocations, the method may than proceed to step 318. At step 318, order promising system 110 holds the allocations and leaves the capacity associated with this particular allocation un-promised. At step 320 the profit associated with holding the allocations is zero.

Order promising system 110 may determine to sell-out or borrow the allocations to the seller associated with the received customer order, the method may than proceeds to step 322. At step 322, order promising system 110 may determine that the seller associated with the received customer order is willing to pay a premium for the allocation and promises the allocations to the seller associated with the received customer. At step 324, the profit associated with the received customer order and promised at step 322, is based on the premium amount offered by the seller. Once a determination of the allocation has been, the method ends. In addition, although, FIG. 3 illustrates one embodiment of a method for allocating manufactured products to sellers using profitable order promising, various changes may be made to method 300 without departing from the scope of embodiments of the present invention.

Figure 4:
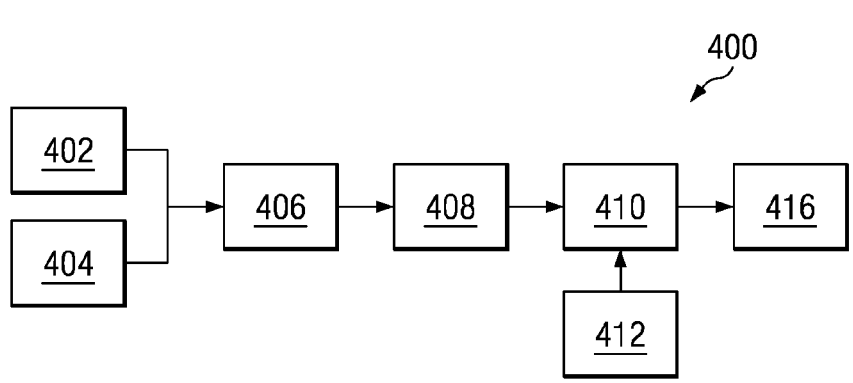
FIG. 4 illustrates a supply chain model according to one embodiment.

FIG. 4 illustrates a supply chain model 400, according to one embodiment. Supply chain model 400 comprises raw materials 402 and 404, routing 406 and 410, intermediate product 408, resource 412, and finished product 416. Although raw materials 402 and 404, routing 406 and 410, a single intermediate product 408, a single resource 412, and a single finished product 416, are shown and described, embodiments contemplate any number of raw materials 402 and 404, any number of routings 406 and 410, any number of intermediate products 408, any number of resources 412, and any number of finished products 416, according to particular needs.

In one embodiment, order promising system 110 represents a supply chain model 400 of one or more enterprises 120a-120n. Supply chain model 400 may produce a finished product 416 from an intermediate product 408 using one unit of resource 412. In addition, routing 412 may take a particular period of time to produce finished product 416, such as, for example, 1 week. Intermediate product (IP) 408 may be a combination of raw material 402 and 404 and may take a particular period of time to produce intermediate product 408 (i.e., routing 406), such as, for example, 2 weeks.

FIG. 5 illustrates a profitable order promising interface 500 according to supply chain model 400 of FIG. 4. Profitable order promising interface 500 may comprise one or more graphical elements including available-to-promise buckets 510 and allocations 520. Although, profitable order promising interface 500 is shown and described as having one or more graphical elements including a visual representation of a plurality of available-to-promise bucket 510 elements and a plurality of allocation 520 elements, embodiments contemplate any suitable number of graphical elements, according to particular needs. As will be explained below in greater detail, profitable order promising interface 500 may provide a visual representation of a rule based workflow, according to particular needs.

In one embodiment, available-to-promise buckets 510 may provide the available supply associated with supply chain model 400. Available-to-promise buckets 510 may be based on a particular time horizon, such as, for example, every day, every week, every month, or any other like time horizon. As an example only and not by way of limitation, available-to-promise buckets 510 may comprise finished product manufactured (FP Manufact.) 511, finished product in-process (FP In-Process) 512, finished product total (FP Total) 513, intermediate product manufactured (IP Manufact.) 514, intermediate product in-process (IP In-Process) 515, intermediate product total (IP Total) 516, resource (Res) 517 and raw materials (RM1 and RM2) 518 and 519. Although, example available-to-promise buckets 510 are shown and described, embodiments contemplate any other suitable available-to-promise buckets, such as, for example, supplier inventory, logistical capacity, consigned inventory, available to promise supply, and/or any other available-to-promise buckets, according to particular needs.

In another embodiment, allocations 520 may provide the allocations of supply associated with supply chain model 400. Allocations 520 may be based on a particular time horizon, such as, for example, every week, every month, every year, or any other like time horizon. As an example only and not by way of limitation, allocations 520 may comprise the total supply (Total Supply) 521 of resource (Res) 517, for the time horizon associated with allocations 520. Total supply (Total Supply) 521 may provide for how the supply of resource (Res) 517 is to be reserved across the hierarchy of sellers.

Allocations 520 may also comprise top seller total (Total) 522, top seller retained (Retained) 523, top seller local pool (Local Pool) 523, seller1 total (Total) 525, seller1 retained (Retained) 526, seller1 local pool (Local Pool) 527, seller2 total (Total) 528, seller2 retained (Retained) 529, and seller2 local pool (local Pool) 530. In addition, as discussed above, order promising system 110 may provide a seller hierarchy model that represents a hierarchy of sellers, such as, for example, seller hierarchy 200 of FIG. 2. Accordingly, the top seller may be, for example, top seller 210, seller1 may be, for example, sub-seller 220, and seller2 may be, for example, sub-seller 250. In addition, the top seller is provided access to all of the supply, but may choose to reserve a portion of the supply to seller1 of and/or seller2. In essence, any supply that is not retained by, for example, the top seller is available to the children associated with top seller. Although example allocations 520 are shown and described, embodiments contemplate any suitable allocations and/or any combination of allocations, according to particular needs.

In one embodiment, allocations 520 may comprise a nested structure associated with allocations 520. This nested structure may comprise one or more parameters coupled with the particular allocation of resources for providing profitable order promising. As an example only and not by way of limitation, the one or more parameters may be associated with a cost point, profits, margins, carbon footprint resources, and other like parameters. In another embodiment, the one or more parameters may be determined by one or more enterprises 120a-120n, for each of the hierarchy of sellers and for each of the particular time horizons. In addition or as an alternative, the one or more parameters for one seller may be different than the one or more parameters for another seller and the one or more parameters for one seller tier may be different than the one or more parameters for another seller tier. In addition, the one or more parameters may be either internally stored in order promising system 110 and/or stored in a look-up table in one or more databases associated with supply chain network 100. Although, example parameters are shown and described, embodiments contemplate any suitable parameter and/or any combination of parameters, according to particular needs.

In another embodiment, order promising system 110 may adjust the one or more parameters, after the initial parameter is determined, based on, for example, shifting supply, demand conditions, and/or other like changes in supply chain network 100. In addition or as an alternative, the one or more adjusted parameters may be either internally stored in order promising system 110 and/or stored in a look-up table in one or more databases associated with supply chain network 100. In addition, order promising system 110 may adjust the one or more parameters using an order promising engine and/or an optimizer associated with order promising system 110.

To further explain the operation of profitable order promising interface 500, an example is now given. In the following example, there are 46 units of total supply 521 of resource (Res) 517 in allocations 520 for month 1. That is, there are 10 units of resource (Res) 517 in week 1, there are 11 units of resource (Res) 517 in week 2, there are 12 units of resource (Res) 517 in week 3, and there are 13 units of resource (Res) 517 in week 4. Out of the 46 units of total supply 521 of resource (Res) 517a in allocations 520 for month 1, 10 units are allocated for top seller total 522, 2 units are retained by the top seller at top seller retained 523, and 8 units are placed in the local pool by the top seller at top seller local pool 524 and are available to the top seller, seller1, and seller2, according to particular needs.

In addition, out of the 46 units of total supply 521 of resource (Res) 517 in allocations 520 for month 1, 30 units are allocated for seller1 total 525, 10 units are retained by seller1 at seller1 retained 526, and 20 units are placed in the local pool by seller1 at seller1 local pool 527 and are available to top seller and seller1, according to particular needs. Furthermore, out of the 46 units of total supply 521 of resource (Res) 517 in allocations 520 for month 1, 6 units are allocated for seller2 total 528, 0 units are retained by seller2 at seller2 retained 529, and 6 units are placed in the local pool by seller2 at seller2 local pool 530 and are available to the top seller and seller2, according to particular needs.

Continuing with this example, a demand (i.e., customer order) is received at seller2 which requires 90 units due week 7, at a margin of $10 per unit. Although, in this example, a particular demand is associated with seller2, a demand may be received from any member of the hierarchy of sellers, at any time, and for any parameter. In addition, in this example finished product manufactured (FP Manufact.) 511 is quantified as unrestricted supply, that is, finished product manufactured (FP Manufact.) 511 is not currently allocated and is available to any member of the hierarchy of sellers. Furthermore, in this example, the one or more parameters coupled with allocations 520 for providing profitable order promising, is a margin determined by one or more enterprises 120a-120n. In this example, the margin determined for seller2 local pool 530 is "unrestricted", the margin determined for top seller local pool 524 is $15 for month 1 and 2, and $10 for month 3. Although, an example parameter is shown and described in FIG. 5, embodiments contemplate any suitable parameter and/or any combination of parameters, according to particular needs.

In order to provide profitable order promising, order promising system 110 allocates the finished product manufactured (FP Manufact.) 511 of available-to-promise buckets 510 starting at week 7 through week 1, for a total of 46 units. Next, order promising system 110 allocates the 15 units available in the local pool at seller2 local pool 530 for month 2 and allocates the 6 units available in the local pool at seller2 local pool 530 for month 1. However, because, in this example, top seller local pool 524 is restricted to a margin of $15 for month 1 and 2 and the received demand is for a margin of $10 per unit, order promising system 110 is not able to allocate the remaining 5 units by week 7. Order promising unit may allocate 4 units available in the top seller local pool 524 for month 3, because the 4 units available in the top seller local pool 524 for month 3 have a margin of $5 and the received demand is for a margin of $10 per unit. Accordingly, order promising system 110 may allocate (promise) 85 units in week 7 and 4 units in month 3, leaving 1 unit un-promised.

In one embodiment, order promising system 110 may generate one or more reports and communicate these one or more reports to the seller associated with the demand or any member of the hierarchy of sellers. In addition, or as an alternative, these one or more reports may provide for the status of the allocations and may include, for example, a root cause report, a reasoning report, and/or any other report. In addition, these reports may describe why a particular demand was not allocated or was allocated short or late, relative to the customer request (i.e., customer order). In the above example, order promising system 110 may generate a report describing why the 4 units will not be allocated until month 3 and/or why the 1 unit remains un-promised. In addition, order promising system 110 may enable one or more workflows to launch resolution procedures in order to resolve why a particular demand was not allocated.

Modifications, additions or omissions may be made to profitable order promising interface 500 without departing from the scope of the invention. As an example and not by way of limitation, profitable order promising interface 500 may have more, fewer, or other graphical elements, available-to-promise buckets, and/or allocations. Moreover, the operation of profitable order promising interface 500 may be performed by more, fewer, or other graphical elements, arranged in any suitable manner, according to particular needs.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for allocating products to one or more sellers, comprising:
  a database configured to store data associated with one or more enterprises;
  an order promising system tangibly embodied on a computer-readable medium, the order promising system coupled with the database and configured to:
    model the flow of the products through the one or more enterprises;
    allocate resources to the one or more sellers based on the modeled flow of the products;
    receive a customer demand associated with the one or more sellers;
    determine a priority of the one or more sellers associated with the received customer demand and perform the following when the one or more sellers associated with the received customer demand is determined to not be at a prioritization to consume the allocations:
      release the allocations to the one or more sellers associated with the received customer demand when a desired system profit is based on an offer by the one or more sellers;
      hold the allocations as un-promised allocations when a desired system profit is zero; and
      borrow the allocations from a seller with a lower price for the allocations and promise the allocations to the one or more sellers associated with the received customer demand at a premium when a desired system profit is based on the premium.

2. The system of claim 1, wherein the order promising system is further configured to provide a seller hierarchy model for representing the one or more sellers.

3. The system of claim 2, wherein the order promising system is further configured to store the seller hierarchy model in the database.

4. The system of claim 3, wherein the seller hierarchy model represents a different hierarchy of sellers for each of the products.

5. The system of claim 3, wherein the one or more enterprises provide allocations to any level of the seller hierarchy model.

6. The system of claim 3, wherein the order promising system is further configured to categorize the seller hierarchy model into one or more seller tiers.

7. The system of claim 1, wherein the order promising system is further configured to prioritize the one or more sellers and wherein a seller with a higher prioritization may receive allocations from the one or more enterprises prior to a seller with a lower prioritization.

8. The system of claim 1, further comprising a rule based workflow associated with the order promising system.

9. The system of claim 8, further comprising:
  a plurality of available-to-promise bucket elements that provide an available supply of one or more products associated with the one or more enterprises; and
  a plurality of allocation elements that provide the allocation of the available supply of the one or more products associated with the one or more enterprises.

10. The system of claim 9, wherein the available-to-promise bucket elements comprises elements selected from the group consisting of:
  a finished product manufactured;
  a finished product in-process;
  a finished product total;
  an intermediate product manufactured;
  an intermediate product in-process;
  an intermediate product total;
  a resource; and
  raw materials.

11. The system of claim 9, wherein the allocation elements comprises elements selected from the group consisting of:
  a total supply of a resource;
  a top seller total;
  a top seller retained;
  a top seller local pool;
  a sub-seller total;
  a sub-seller retained; and
  a sub-seller local pool.

12. The system of claim 9, wherein the plurality of allocation elements comprises a nested structure, the nested structure comprises one or more parameters coupled with a quantity of allocation of resources.

13. The system of claim 12, wherein the order promising system is further configured to adjust the one or more parameters after an initial parameter is determined by the order promising system.

14. The system of claim 1, wherein the order promising system is further configured to:
receive a demand associated with the one or more sellers for a product;
allocate resources that are available-to-promise for the product, based on the modeled flow of the products; and
allocate resources that are residing in a local pool, associated with the one or more sellers, based on one or more parameters coupled with quantity of allocation of resources in the local pool.

15. The system of claim 14, wherein the order promising system is further configured to:
generate one or more reports to identify the status of the allocations of the received demand; and
communicate the one or more reports to the one or more sellers.

16. The system of claim 15, wherein the order promising system is further configured to:
enable one or more workflows to launch one or more resolution procedures in order to resolve the unfilled demand.

17. A method for allocating products to one or more sellers, comprising:
modeling, by a computer, the flow of the products through one or more enterprises;
allocating, by the computer, resources to the one or more sellers based on the modeled flow of the products;
receiving, by the computer, a customer demand associated with the one or more sellers;
determining, by the computer, a priority of the one or more sellers associated with the received customer demand and performing the following when the one or more sellers associated with the received customer demand is determined to not be at a prioritization to consume allocations:
releasing the allocations to the one or more sellers associated with the received customer demand when a desired system profit is based on an offer by the one or more sellers;
holding the allocations as un-promised allocations when a desired system profit is zero; and
borrowing the allocations from a seller with a lower price for the allocations and promise the allocations to the one or more sellers associated with the received customer demand at a premium when a desired system profit is based on the premium.

18. The method of claim 17, further comprising:
providing a seller hierarchy model for representing the one or more sellers.

19. The method of claim 18, further comprising:
storing the seller hierarchy model in a database.

20. The method of claim 19, wherein the seller hierarchy model represents a different hierarchy of sellers for each of the products.

21. The method of claim 19, further comprising:
providing allocations to any level of the seller hierarchy model.

22. The method of claim 19, further comprising:
categorizing the seller hierarchy model into one or more seller tiers.

23. The method of claim 17, further comprising:
prioritizing the one or more sellers and wherein a seller with a higher prioritization may receive allocations from the one or more enterprises prior to a seller with a lower prioritization.

24. The method of claim 17, further comprising:
a rule based workflow.

25. The method of claim 24, further comprising:
a plurality of available-to-promise bucket elements providing an available supply of one or more products associated with the one or more enterprises; and
a plurality of allocation elements providing the allocation of the available supply of the one or more products associated with the one or more enterprises.

26. The method of claim 25, wherein the plurality of allocation elements comprises a nested structure, the nested structure comprises one or more parameters coupled with a quantity of allocation of resources.

27. The method of claim 26, further comprising:
adjusting the one or more parameters after an initial parameter is determined.

28. The method of claim 17, further comprising:
receiving a demand associated with the one or more sellers for a product;
allocating resources that are available-to-promise for the product, based on the modeled flow of the products;
allocating resources that are residing in a local pool, associated with the one or more sellers, based on one or more parameters coupled with quantity of allocation of resources in the local pool.

29. The method of claim 28, further comprising:
generating one or more reports to identify the status of the allocations of the received demand; and
communicating the one or more reports to the one or more sellers.

30. The method of claim 29, further comprising:
enabling one or more workflows to launch one or more resolution procedures in order to resolve the unfilled demand.

31. A non-transitory computer-readable medium embodied with software for allocating products to one or more sellers, the software when executed using one or more computers is configured to:
model the flow of the products through one or more enterprises; and
allocate resources to the one or more sellers based on the modeled flow of the products;
receive a customer demand associated with the one or more sellers;
determine a priority of the one or more sellers associated with the received customer demand and perform the following when the one or more sellers associated with the received customer demand is determined to not be at a prioritization to consume allocations:
release the allocations to the one or more sellers associated with the received customer demand when a desired system profit is based on an offer by the one or more sellers;
hold the allocations as un-promised allocations when a desired system profit is zero; and borrow the allocations from a seller with a lower price for the allocations and promise the allocations to the one or more sellers associated with the received customer demand at a premium when a desired system profit is based on the premium.

32. The computer-readable medium of claim 31, wherein the software is further configured to:
provide a seller hierarchy model for representing the one or more sellers.

33. The computer-readable medium of claim 32, wherein the software is further configured to:
store the seller hierarchy model in a database.

34. The computer-readable medium of claim 33, wherein the seller hierarchy model represents a different hierarchy of sellers for each of the products.

35. The computer-readable medium of claim 33, wherein the software is further configured to:
provide allocations to any level of the seller hierarchy model.

36. The computer-readable medium of claim 33, wherein the software is further configured to:
categorize the seller hierarchy model into one or more seller tiers.

37. The computer-readable medium of claim 31, wherein the software is further configured to:
prioritize the one or more sellers and wherein a seller with a higher prioritization may receive allocations from the one or more enterprises prior to a seller with a lower prioritization.

38. The computer-readable medium of claim 31, wherein the software is further configured to:
provide a rule based workflow.

39. The computer-readable medium of claim 38, wherein the software is further configured to:
provide a plurality of available-to-promise bucket elements, wherein the available-to-promise bucket elements provide an available supply of one or more products associated with the one or more enterprises; and
provide a plurality of allocation elements, wherein the allocation elements provide the allocation of the available supply of the one or more products associated with the one or more enterprises.

40. The computer-readable medium of claim 39, wherein the plurality of allocation elements comprises a nested structure, the nested structure comprises one or more parameters coupled with a quantity of allocation of resources.

41. The computer-readable medium of claim 40, wherein the software is further configured to:
adjust the one or more parameters after an initial parameter is determined.

42. The computer-readable medium of claim 31, wherein the software is further configured to:
receive a demand associated with the one or more sellers for a product;
allocate resources that are available-to-promise for the product, based on the modeled flow of the products;
allocate resources that are residing in a local pool, associated with the one or more sellers, based on one or more parameters coupled with quantity of allocation of resources in the local pool.

43. The computer-readable medium of claim 42, wherein the software is further configured to:
generate one or more reports to identify the status of the allocations of the received demand; and
communicate the one or more reports to the one or more sellers.

44. The computer-readable medium of claim 43, wherein the software is further configured to:
enable one or more workflows to launch one or more resolution procedures in order to resolve the unfilled demand.

45. The system of claim 1, wherein the order promising system is further configured to:
promise the allocations to the seller associated with the received customer demand when the one or more sellers associated with the received customer demand is determined to be at a prioritization to consume the allocations.

46. The method of claim 18, further comprising:
promising the allocations to the seller associated with the received customer demand when the one or more sellers associated with the received customer demand is determined to be at a prioritization to consume the allocations.

47. The computer-readable medium of claim 31, wherein the software is further configured to:
promise the allocations to the seller associated with the received customer demand when the one or more sellers associated with the received customer demand is determined to be at a prioritization to consume the allocations.

* * * * *